(12) United States Patent
Dix et al.

(10) Patent No.: US 7,677,640 B2
(45) Date of Patent: Mar. 16, 2010

(54) PANEL ASSEMBLY FOR A VEHICLE

(75) Inventors: Jeff Dix, Farmington Hills, MI (US); Lauren Parkins, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 12/126,491

(22) Filed: May 23, 2008

(65) Prior Publication Data

US 2009/0289470 A1   Nov. 26, 2009

(51) Int. Cl.
*B60J 5/00* (2006.01)
(52) U.S. Cl. .............................. 296/146.7; 296/187.12
(58) Field of Classification Search .............. 296/146.5, 296/146.6, 146.7, 187.12
See application file for complete search history.

(56) References Cited

U.S. PATENT DOCUMENTS

| | | | |
|---|---|---|---|
| 5,040,335 A * | 8/1991 | Grimes | ......................... 49/502 |
| 6,196,619 B1 | 3/2001 | Townsend et al. | |
| 6,378,934 B1 | 4/2002 | Palazzolo et al. | |
| 6,554,356 B1 | 4/2003 | Crose | |
| 6,692,071 B2 | 2/2004 | Fowler | |
| 6,698,819 B1 | 3/2004 | Mozer | |
| 6,786,508 B2 | 9/2004 | Fraley et al. | |
| 6,857,688 B2 | 2/2005 | Morrison et al. | |
| 6,857,698 B2 | 2/2005 | Saberan et al. | |
| 6,921,128 B2 | 7/2005 | Davis, Jr. et al. | |
| 7,090,293 B2 | 8/2006 | Saberan et al. | |
| 2002/0038965 A1 | 4/2002 | Palazzolo et al. | |
| 2003/0151279 A1 | 8/2003 | Fowler | |
| 2003/0173763 A1 | 9/2003 | Yamazaki et al. | |
| 2003/0218356 A1 | 11/2003 | Emerling et al. | |
| 2005/0242634 A1 | 11/2005 | Serber | |
| 2005/0264053 A1 | 12/2005 | Saberan et al. | |
| 2006/0028047 A1 | 2/2006 | Adams et al. | |
| 2007/0046010 A1 | 3/2007 | Haba et al. | |

\* cited by examiner

*Primary Examiner*—Joseph D Pape
(74) *Attorney, Agent, or Firm*—Young Basile

(57) ABSTRACT

A panel assembly for a vehicle door has trim panel coupled to the door and having at least a portion thereof that is spaced from the door's outboard frame. The trim panel has first and second impact areas. A plurality of energy absorbing structures is arranged in an array between the trim panel and the door frame. Each energy absorbing structure has a base end, an outboard end, and at least one sidewall. The base end is adjacent to the trim panel. The outboard end engages the vehicle door. The sidewall may include either or both of a reinforcement structure and a weakening structure that are sized and configured so that the energy absorbing structure has a predetermined range of energy absorption against the occupant during a side-impact collision. Energy absorbing structures having different energy absorption characteristics are located adjacent to the first and second impact areas.

29 Claims, 12 Drawing Sheets

PANEL ASSEMBLY FOR A VEHICLE

FIELD OF THE INVENTION

The invention relates to panel assemblies for use in vehicles, including door panels, and in particular to panel assemblies that provide energy absorption to protect occupants during a collision.

BACKGROUND

Doors for motor vehicles include side impact counter measures such as foam pads or brackets that are placed between a trim panel and a door frame or a bolster that is attached to the door frame. The padding or brackets are capable of absorbing significant amounts energy at a force-deflection rate safe for occupants. In a side-impact collision, the occupant strikes the door and experiences a reaction force. The foam pads or brackets exert a reaction force through a range of displacement during a collision.

To reduce the risk of serious injury, the reaction force exerted upon the occupant should be kept below 6 kN through at least 55 mm. The force exerted upon the vehicle occupant will depend upon a number of factors, including the severity of the impact, the structural characteristics of the side impact counter measures, and the mass of the occupant.

SUMMARY

The invention provides a panel assembly for a vehicle door that includes a trim panel and a first plurality of energy absorbing structures that are arranged in an array. The trim panel has a first impact area and a second impact area. A first energy absorbing structure of the first plurality of energy absorbing structures has a first predetermined range of energy absorption and is adapted to engage the first impact area of the trim panel. A second energy absorbing structure of the first plurality of energy absorbing structures has a second predetermined range of energy absorption that is greater than the first predetermined range of energy absorption and is adapted to engage the second impact area of the trim panel.

In some embodiments, the first energy absorbing structure has at least one weakening structure that is sized and configured so that the first energy absorbing structure has the first predetermined range of energy absorption. Furthermore, the first energy absorbing structure may have at least one side wall having a first aperture formed therethrough that is sized and configured so that the first energy absorbing structure has the first predetermined range of energy absorption. Additionally, the second energy absorbing structure may have at least one side wall having a second aperture formed therethrough that is smaller than the first aperture and is sized and configured so that the second energy absorbing structure has the second predetermined range of energy absorption.

In other embodiments a third energy absorbing structure of the first plurality of energy absorbing structures is provided, and has a third predetermined range of energy absorption that is greater than the second predetermined range of energy absorption. The third energy absorbing structure has at least one stiffening structure that is sized and configured so that the third energy absorbing structure has the third predetermined range of energy absorption.

In another embodiment, the second energy absorbing structure has a stiffening structure that is sized and configured so that the second energy absorbing structure has the second predetermined range of energy absorption. Furthermore, the second energy absorbing structure may have at least one side wall, where the stiffening structure includes at least one rib provided on the side wall.

In a further embodiment, the first energy absorbing structure has at least one side wall having an aperture formed therethrough that is sized and configured so that the first energy absorbing structure has the first predetermined range of energy absorption while the second energy absorbing structure has at least one side wall having a stiffening rib provided thereon that is sized and configured so that the second energy absorbing structure has the second predetermined range of energy absorption.

In some embodiments, the energy absorbing structures of the first plurality of energy absorbing structures are arrayed in a front to rear manner with respect to the vehicle door.

In another embodiment, the energy absorbing structures of the first plurality of energy absorbing structures are formed integrally.

In a further embodiment, the first impact area is disposed forward of the second impact area with respect to the vehicle door.

In an additional embodiment, a second plurality of energy absorbing structures is arranged in an array, wherein the second plurality of energy absorbing structures is disposed below the first plurality of energy absorbing structures with respect to the vehicle door. A fourth energy absorbing structure having a fourth predetermined range of energy absorption of the second plurality of energy absorbing structures is adapted to engage the first impact area of the trim panel, and a fifth energy absorbing structure of the second plurality of energy absorbing structures has a fifth predetermined range of energy absorption that is greater than the fourth predetermined range of energy absorption.

In some embodiments, at least one energy absorbing structure may include a lateral wall having a generally linear peripheral edge and a notch provided on the peripheral edge at a location selected to provide a predetermined deformation characteristic.

In another embodiment, the panel assembly includes at least one energy absorbing structure that has a top surface for engaging the vehicle door and at least one substantially planar side wall, wherein the top surface and the side wall are connected at a radiused corner.

In another embodiment, at least one energy absorbing structure of the first plurality of energy absorbing structures has a top surface for engaging the vehicle door and at least one wire clip provided on the top surface.

In a further embodiment, the panel assembly includes a base panel that is provided between a pair of adjacent energy absorbing structures of the plurality of energy absorbing structures and a fastener that connects the base panel to the trim panel.

In an additional embodiment, each energy absorbing structure of the first plurality of energy absorbing structures has a contoured engagement surface formed thereon, wherein at least a portion of the contoured engagement surface complimentarily engages the vehicle door in a normal operating condition of the vehicle.

BRIEF DESCRIPTION OF THE DRAWINGS

The description herein makes reference to the accompanying drawings wherein like referenced numerals refer to like parts throughout the several views, and wherein.

DETAILED DESCRIPTION

Figure 1:
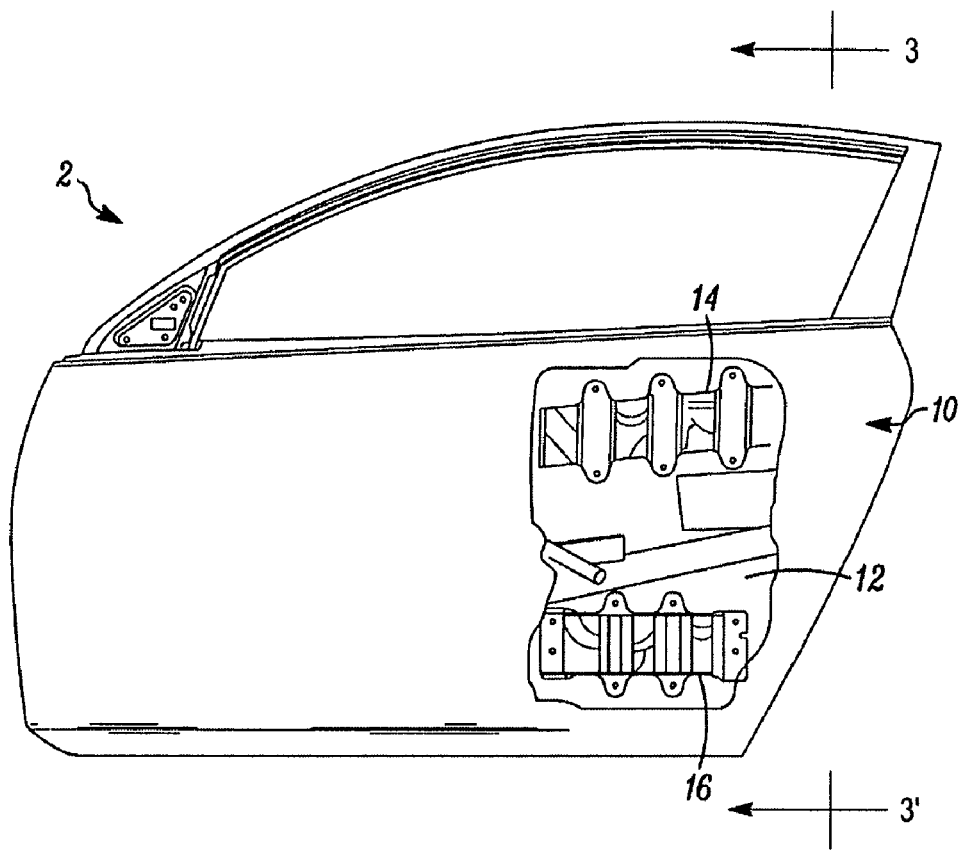
FIG. 1 is a partial cut-away view of a door of an automobile having a panel assembly in accordance with a first embodiment.
Figure 2:
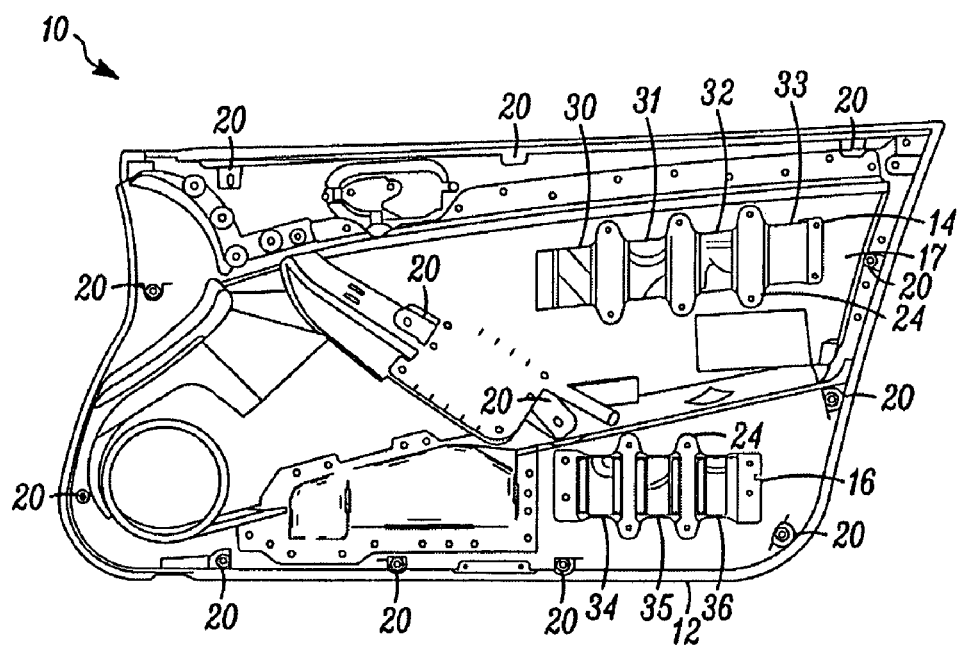
FIG. 2 is a sectional view of the door as shown in FIG. 1 taken along the lines 2-2' in FIG. 3.
Figure 3:
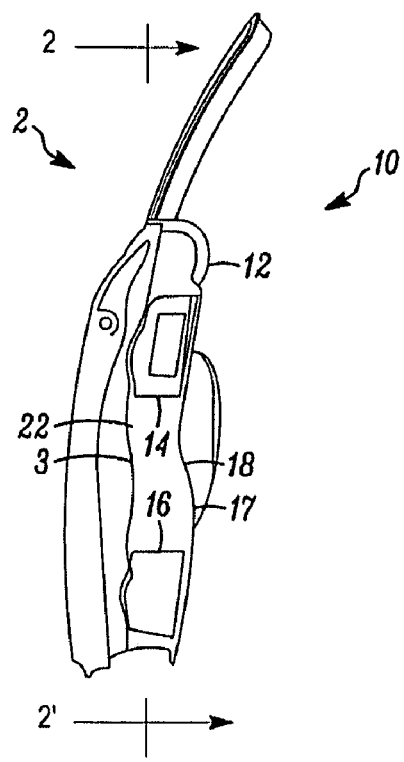
FIG. 3 is a sectional view of the door of FIG. 1 taken along the lines 3-3'.

FIGS. 1-4 show a panel assembly 10 for a vehicle door 2 of a vehicle 1. The panel assembly 10 includes a trim panel 12 and at least one energy absorbing assembly, such as an upper energy absorbing assembly 14 and a lower energy absorbing assembly 16. The panel assembly 10 can be provided adjacent to the driver's side front door and the passenger's side front door, but may be provided for any or all of the vehicle doors 2 of the vehicle 1. Furthermore, the vehicle door 2 may include various constituent parts, such as one or more frame portions, a window assembly, a bolster, divider panels, speaker enclosures, etc., all of which are referred to collectively herein as an internal portion 3 of the vehicle door 2.

The trim panel 12 is typically a shell like structure that is connected to the vehicle door 2 to present a finished exterior surface 18 toward an interior 4 of the vehicle 1. The trim panel 12 can be provided in various configurations, such as multiple portions that are connected to the door, as a structure that is formed integrally with the door, or as a layered structure. The trim panel 12 can be fabricated from suitable materials that include, without limitation, plastics, metals and composites. The trim panel 12 can include a plurality of connecting portions 20, such as clips, posts, screws and the like, as are well known in the automotive door arts. Most of the connecting portions 20 are disposed along the periphery of the trim panel 12, while some of the connecting portions 20 are disposed at intermediate locations on the trim panel 12. In addition to allowing secure connection of the trim panel 12 to the vehicle door 2, the connecting portions 20 extend generally inward from the exterior surface 18 of the trim panel 12. Thus, the connecting portions 20 space at least portions of the exterior surface 18 from the vehicle door 2 to create a cavity 22 between the trim panel 12 and the vehicle door 2.

The upper energy absorbing assembly 14 includes a plurality of energy absorbing structures, namely a front energy absorbing structure 30, a front-middle energy absorbing structure 31, a rear middle energy absorbing structure 32, and a rear energy absorbing structure 33 that can be arranged in an array, as will be explained in detail herein. Similarly, the lower energy absorbing assembly 16 includes a plurality of energy absorbing structures, namely a front energy absorbing structure 34, a middle energy absorbing structure 35, and a rear energy absorbing structure 36 that are arranged in an array, as will also be explained in detail herein. However, the upper energy absorbing assembly 14 and the lower energy absorbing assembly are not limited to including any particular number of energy absorbing structures, but rather, may include any desired number of energy absorbing structures.

The upper energy absorbing assembly 14 and the lower energy absorbing assembly 16 are both disposed between the trim panel 12 and the vehicle door 2, in the cavity 22 formed between the trim panel 12 and the vehicle door 2. As shown and described herein, the energy absorbing assemblies 14, 16, are connected to an interior surface 17 of the trim panel 12 by fasteners 24, such as pins or stakes, as are well known in the art. However, it should be understood that the energy absorbing assemblies 14, 16 need only be engageable with both the internal portion 3 of the vehicle door 2 and the trim panel 12 during an impact, and thus, the energy absorbing structures may be engaged with one, both, or neither of the trim panel 12 and the internal portion 3 of the vehicle door 2 during a normal operating condition of the vehicle 1.

Figure 4:
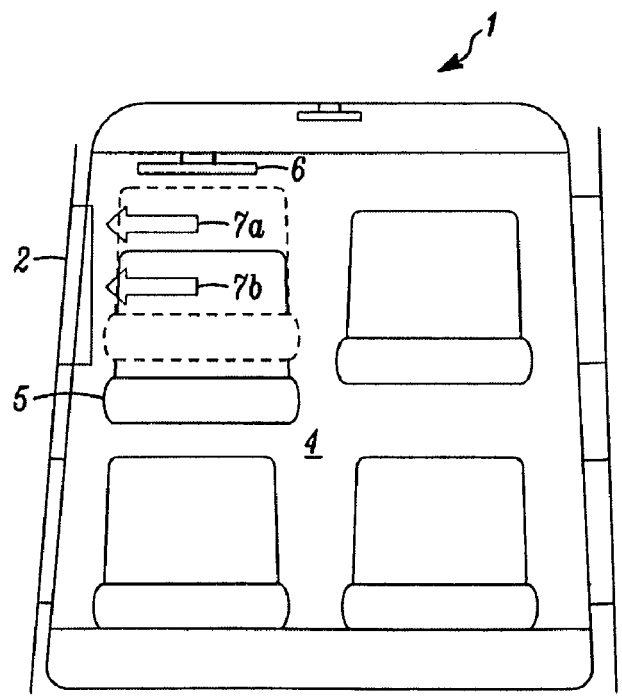
FIG. 4 is a diagrammatic top plan view of a vehicle showing front and rear impact areas.

As best seen in FIG. 4, the upper energy absorbing assembly 14 and the lower energy absorbing assembly 16 are disposed within the vehicle door 2 adjacent to a vehicle seat, such as a driver's seat 5 that is positioned within the interior 4 of the vehicle 1. In typical vehicles 1, the driver's seat 5 is adjacent to the door 2, and may be moved longitudinally with respect to the vehicle to adjust the position of the seat occupant with respect to a steering wheel 6 and other controls of the vehicle 1. The ability of the occupant to move with respect to the vehicle door 2 creates two or more potential impact areas, such as a front impact area 7a and a rear impact area 7b, where the occupant may strike the trim panel 12 of the panel assembly 10 if the vehicle 1 is involved in a side-impact collision. For example, a small vehicle occupant, such as a vehicle occupant having below average height, may move the seat 5 to a forward position (shown in dashed lines in FIG. 4) with respect to the vehicle door 2a, while a large vehicle occupant, such as a vehicle occupant having above average height, may move the seat 5 to a rearward position (shown in solid lines in FIG. 4) with respect to the vehicle door 2a.

During a side impact collision, each occupant would move generally transverse to the vehicle. Thus, the small vehicle occupant would strike the vehicle door 2 at a more forward location thereon, such as in the front impact area 7a, while the large vehicle occupant would strike the vehicle door 2 at a more rearward location thereon, such as the rear impact area 7b. However, since the energy absorbing assemblies 30-33 of the upper energy absorbing assembly 14 and the energy absorbing structures 34-36 of the lower energy absorbing assembly 16 can be arranged in arrays that extend frontward to rearward with respect to the vehicle door 2, at least one energy absorbing structure 30-36 of each of the upper and lower energy absorbing assemblies 14, 16 can be disposed within the front impact area 7*a* and at least one energy absorbing structure 30-36 of each of the upper and lower energy absorbing assemblies 14, 16 is disposed within the rear impact area 7*b*.

Figure 5:
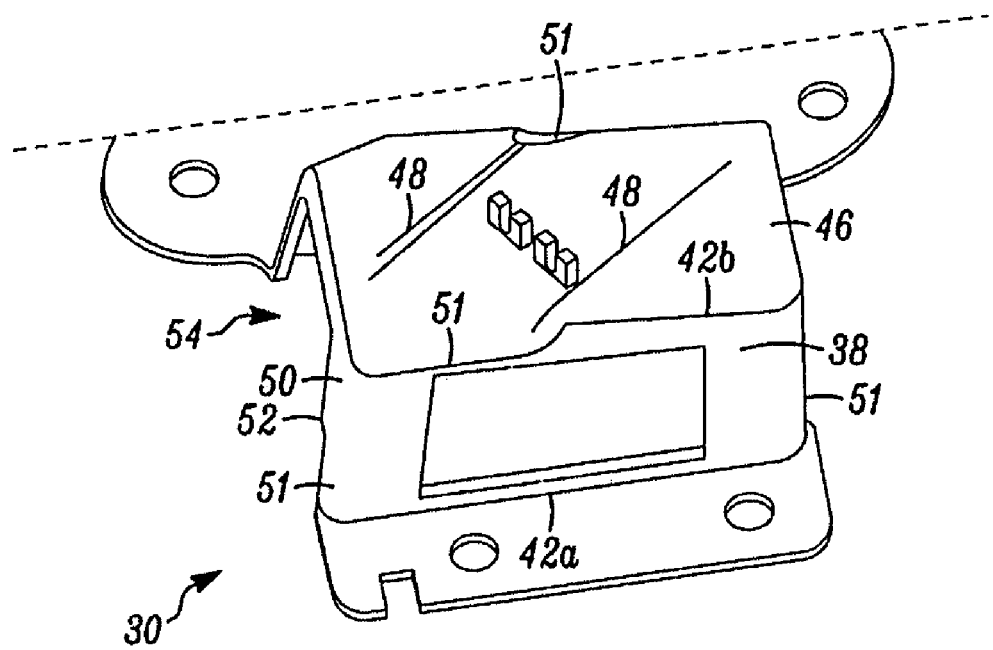
FIG. 5 is a front perspective view of a front energy absorbing structure of an upper energy absorbing assembly.
Figure 6:
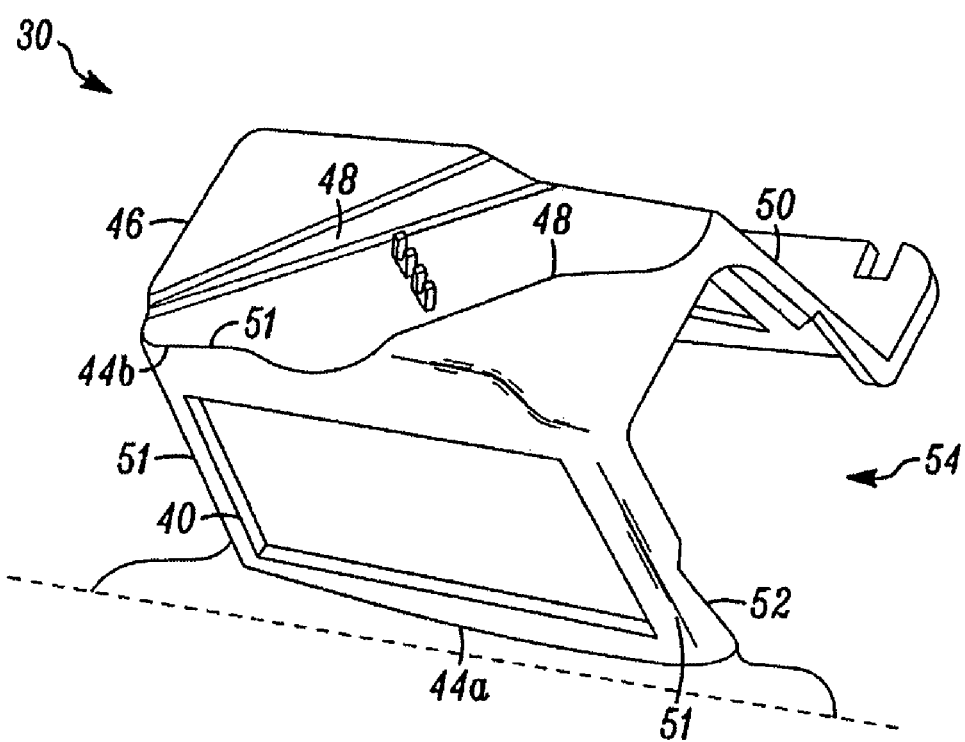
FIG. 6 is a rear perspective view of the front energy absorbing structure of the upper energy absorbing assembly.
Figure 7:
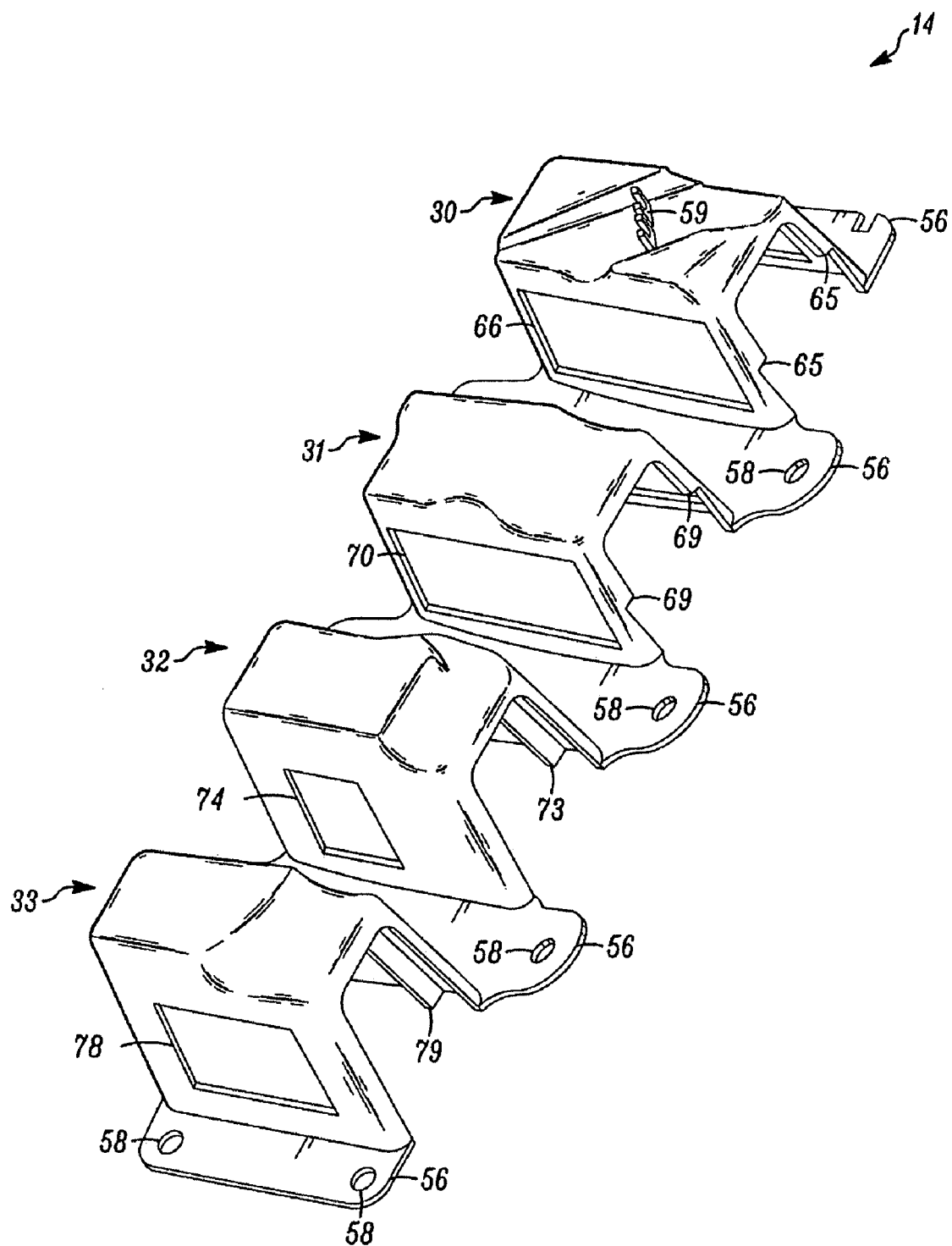
FIG. 7 is a perspective view of the upper energy absorbing assembly.
Figure 9:
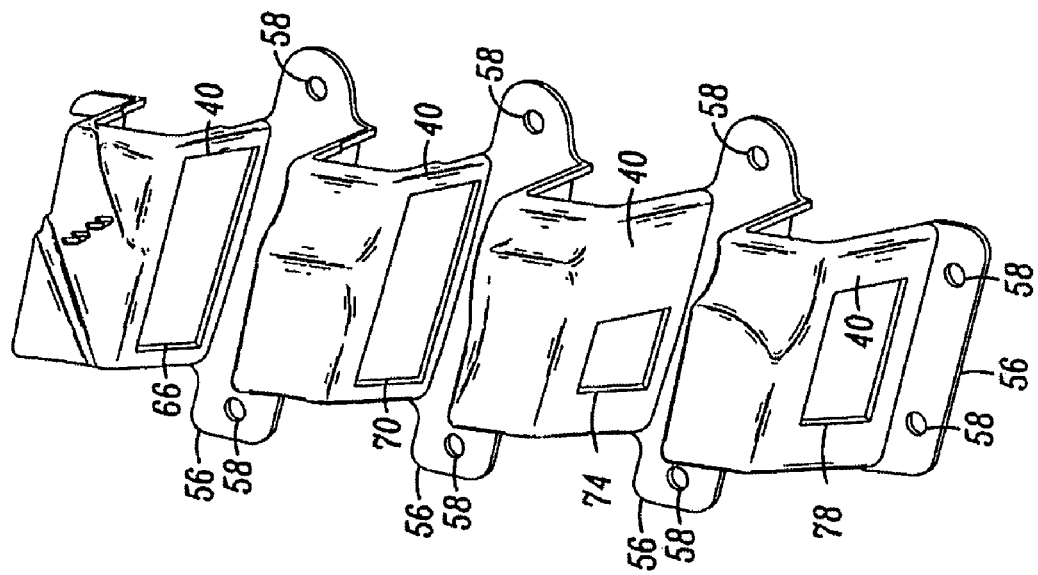
FIG. 9 is a rear perspective view of the upper energy absorbing assembly shown in FIG. 7.
Figure 8:
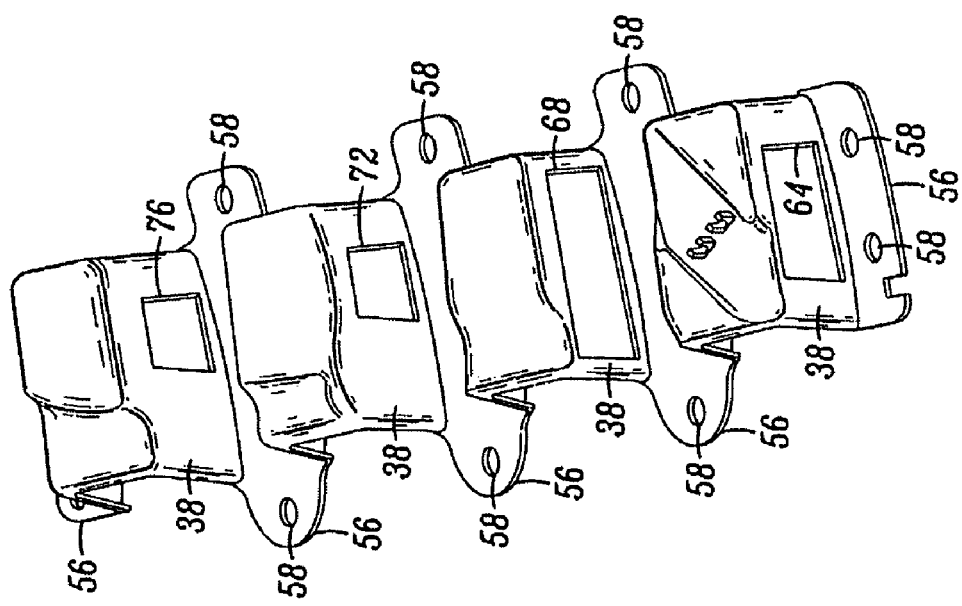
FIG. 8 is a front perspective view of the energy absorbing assembly shown in FIG. 7.
Figure 10:
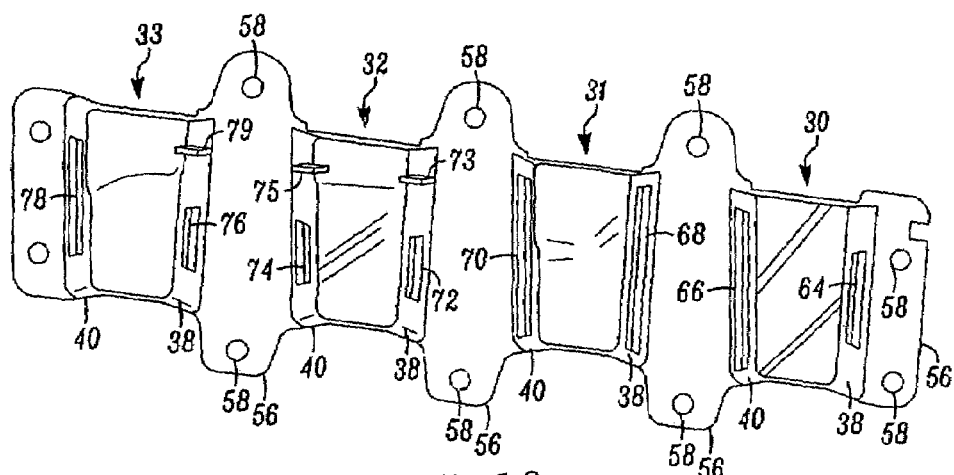
FIG. 10 is a bottom view of the upper energy absorbing assembly shown in FIG. 7.
Figure 11:
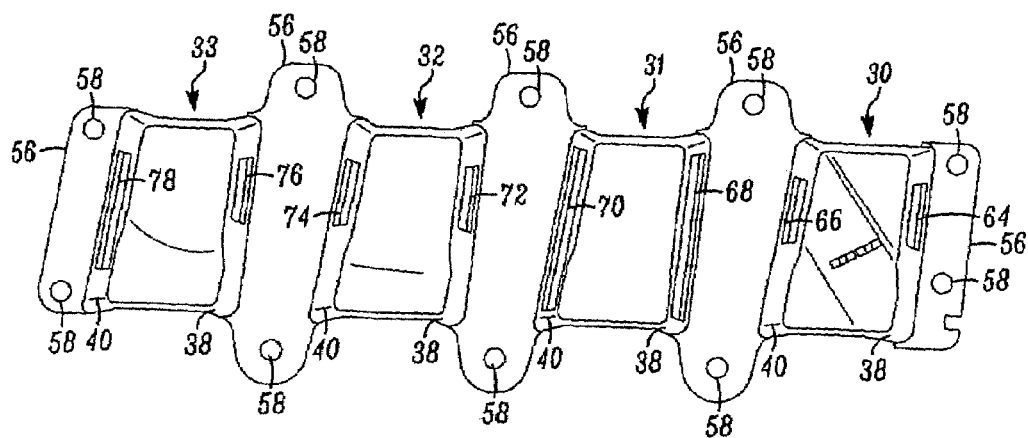
FIG. 11 is a top view of the upper energy absorbing assembly shown in FIG. 7.
Figure 12:
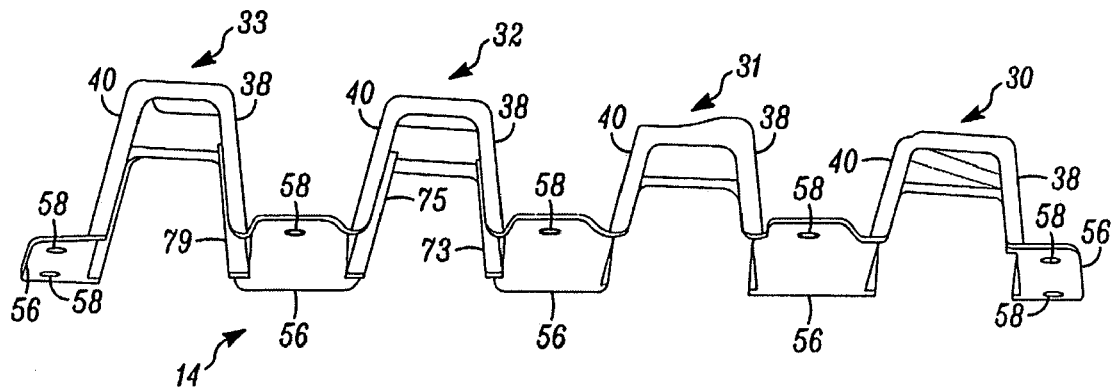
FIG. 12 is a side elevation of the upper energy absorbing assembly shown in FIG. 7.
Figure 13:
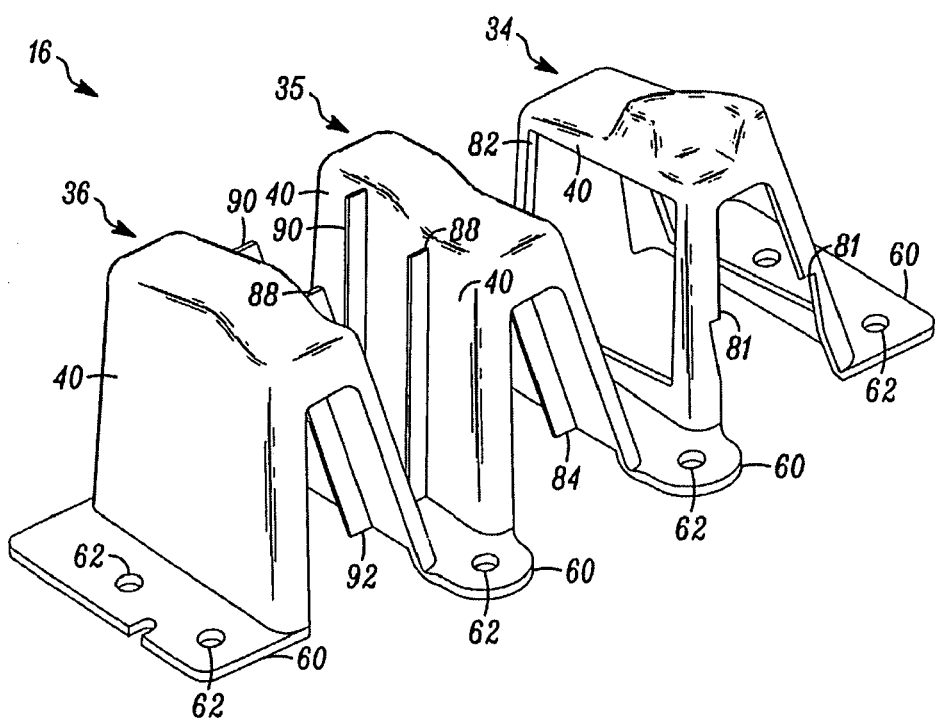
FIG. 13 is a top perspective view of a lower energy absorbing assembly.
Figure 14:
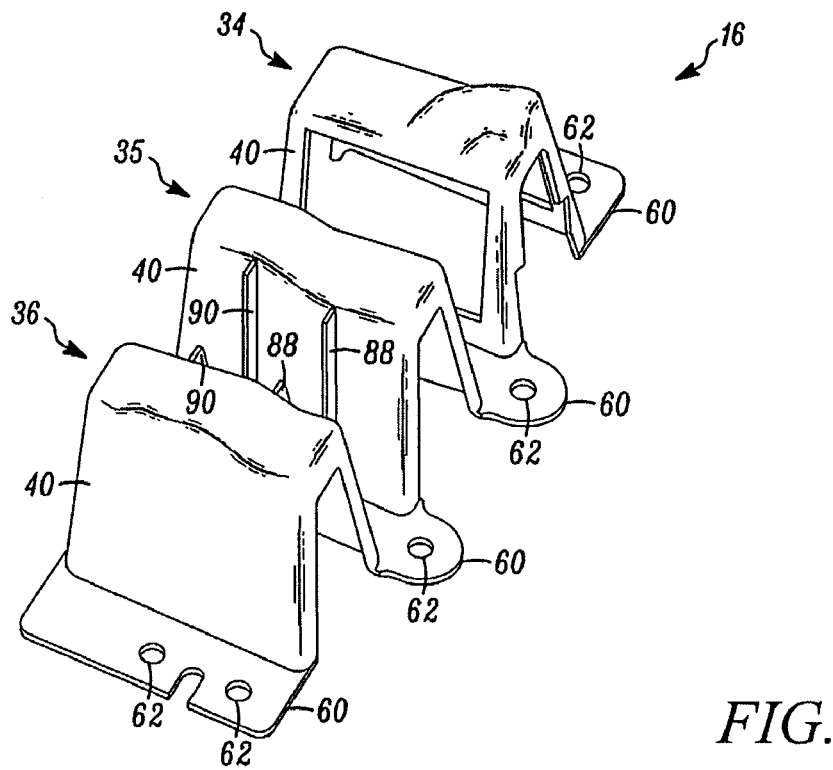
FIG. 14 is a rear perspective view of the lower energy absorbing assembly shown in FIG. 13.
Figure 15:
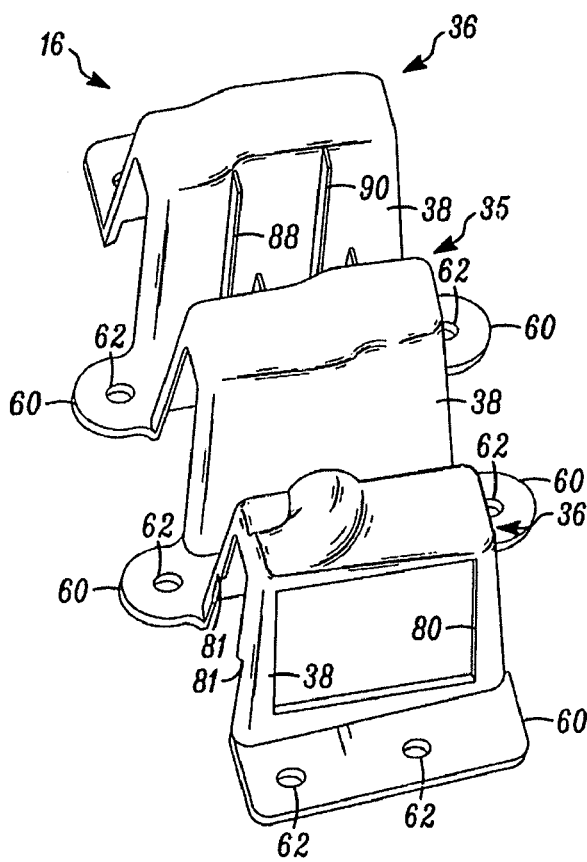
FIG. 15 is a front perspective view of the lower energy absorbing assembly shown in FIG. 13.
Figure 16:
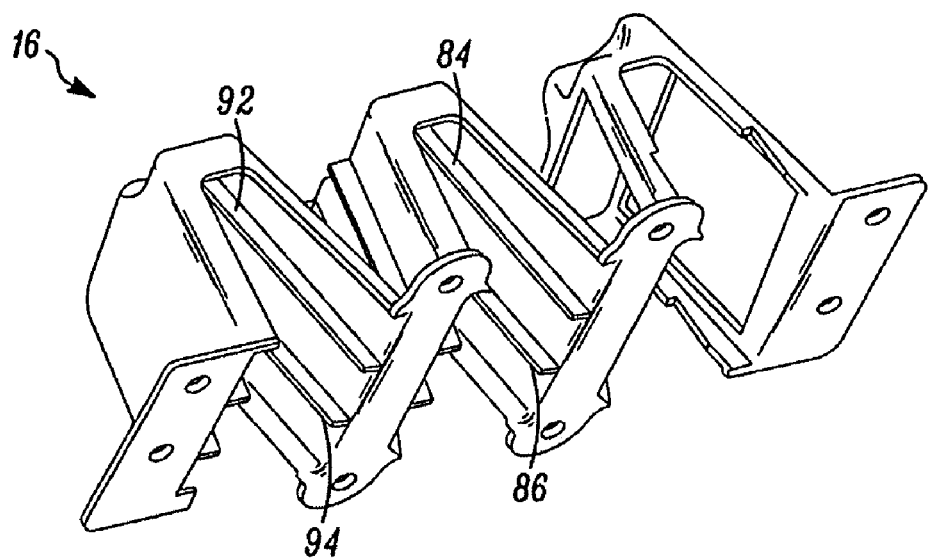
FIG. 16 is a bottom perspective view of the lower energy absorbing assembly shown in FIG. 13.
Figure 17:
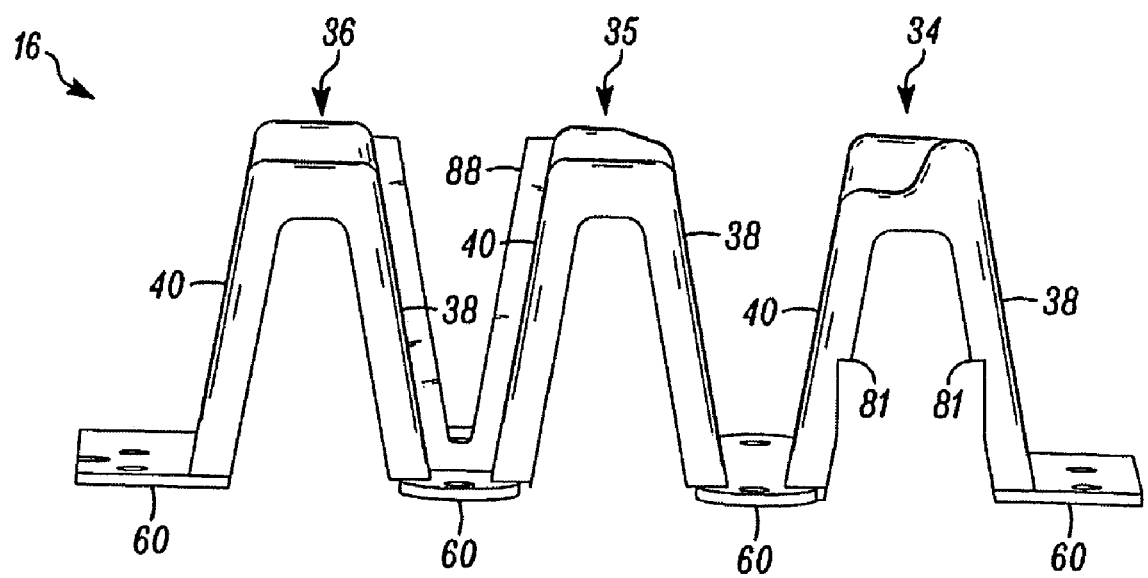
FIG. 17 is a side elevation of the lower energy absorbing assembly shown in FIG. 13.
Figure 18:
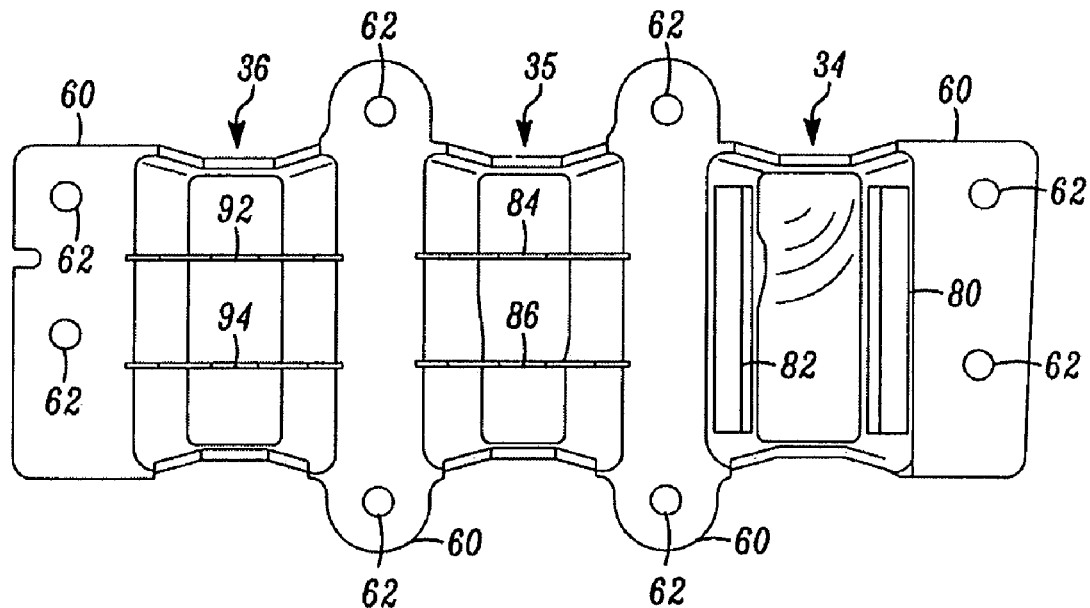
FIG. 18 is a bottom view of the lower energy absorbing assembly shown in FIG. 13.
Figure 19:
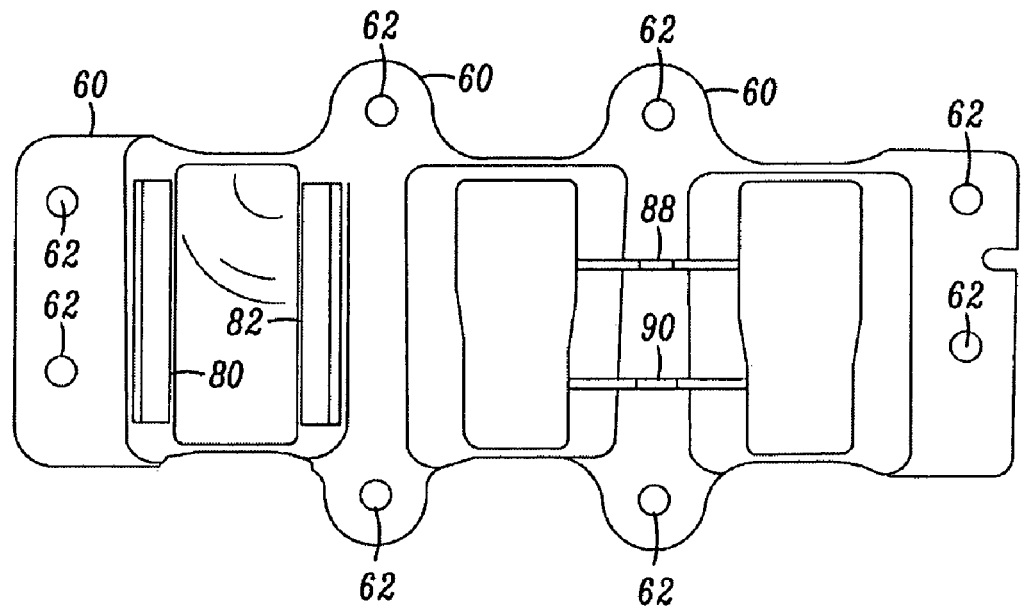
FIG. 19 is a top view of the plurality of the lower energy absorbing assembly shown in FIG. 13.

FIGS. 5-6 show the front energy absorbing structure 30 of the upper energy absorbing assembly as exemplary of the plurality of energy absorbing structures 30-33 of the upper energy absorbing assembly 14 and the plurality of energy absorbing structures 34-36 of the lower energy absorbing assembly 16. Each of the energy absorbing structures 30-36 includes the features described in connected with the front energy absorbing structure 30, except as specifically noted therein.

The front energy absorbing structure 30 includes a pair of side walls, namely a front longitudinal wall 38 and a rear longitudinal wall 40, a top surface 46, and a pair of lateral walls 50. The front longitudinal wall 38 is substantially planar, and extends from a base end 42*a* to an outboard end 42*b*. The rear longitudinal wall 40 is substantially planar, and extends from a base end 44*a* to an outboard end 44*b*. When the upper energy absorbing assembly 14 is installed on the trim panel 12, the base ends 42*a*, 44*a* of the front longitudinal wall 38 and the rear longitudinal walls 40 of the front energy absorbing structure 30 can be positioned adjacent to the interior surface 17 of the trim panel 12.

The top surface 46 of the front energy absorbing structure 30 of the upper energy absorbing assembly 14 is connected to the outboard ends 42*b*, 44*b* of the front longitudinal wall 38 and rear longitudinal wall 40. With regard to at least some of the energy absorbing structures 30-36, the top surfaces 46 of the energy absorbing structures 30-36 may include contours 48 to provide a contoured top surface 46 that can be adapted to complimentarily engage the internal portion 3 of the vehicle door 2 when the panel assembly 10 is connected to the vehicle door 2. Since the internal portion 3 of the vehicle door 2 may include discontinuities, undulations, or other geometrical variations, the contours 48 provided on each energy absorbing structure 30-36 are designed to engage a particular area of the internal portion 3 of the door 2. By providing the contours 48, gaps between the upper and lower energy absorbing assemblies 14, 16 and the internal portion 3 of the vehicle door 2 are reduced or substantially eliminated, so that the energy absorbing structures 30-36 of the upper and lower energy absorbing assemblies 14, 16 may be substantially engaged with the internal portion 3 of the vehicle door 2 prior to an impact. Thus, the upper and lower energy absorbing assemblies 14, 16 do not have to move into engagement with the internal portion 3 of the vehicle door 2 at the time of an impact prior to performing their energy absorbing function. Also, force concentrations due to uneven engagement of the upper and lower energy absorbing assemblies 14, 16 are avoided. The contours 46 may also provide troughs in which wire clips 59 may be provided on the top surfaces 48 of the energy absorbing structures 30-36 if desired, to allow wires or cables (not shown) to be securely fixed to the upper or lower energy absorbing assemblies 14, 16 and thus precisely routed within the door 2.

The front and rear longitudinal walls 38, 40 of the front energy absorbing structure 30 extend upwardly and inwardly toward one another from the base ends 42*a*, 44*a* thereof to the top surface 46. Thus, the front and rear longitudinal walls 38, 40 and the top surface 46 cooperate to define a substantially trapezoidal lateral profile for the lateral walls 50 of the front energy absorbing structure 30. Each lateral wall 50 is connected to the front and rear longitudinal walls 38, 40 as well as the top surface 46. The lateral walls 50 include a peripheral edge 52 that is offset from the front and rear longitudinal walls 38, 40 and the top surface 46 by a substantially uniform distance to create an open area 54 in each lateral wall 50.

In order to provide even force distribution throughout the front energy absorbing structure 30, radiused corners 51 can be provided on the front energy absorbing structure 30. In particular, the radiused corners can be provided at the junction of front longitudinal wall 38 and the top surface 46, at the junction of the rear longitudinal wall 40 and the top surface 46, and at the junction of the lateral walls 50 with the front and rear longitudinal walls 38, 40 and the top surface 46.

As seen in FIGS. 7-12, the upper energy absorbing assembly 14 includes the front energy absorbing structure 30, the front-middle energy absorbing structure 31, the rear middle energy absorbing structure 32, and the rear energy absorbing structure 33, which are arranged in an array longitudinally. When installed in the vehicle 1, the energy absorbing structures 30-33 are aligned in a front to rear manner with respect to the vehicle door 2. The upper energy absorbing assembly 14 includes a plurality of base panels 56 that interconnect the energy absorbing structures 30-33 and provide substantially planar surfaces having apertures 58 formed therethrough, in which the fasteners 24 are received to connect the upper energy absorbing assembly 14 to the trim panel 12. The upper energy absorbing assembly 14 may be fabricated as an integral structure, for example, as an injection molded plastic structure. However, the upper energy absorbing assembly 14 need not be formed integrally, and alternatively, could include a plurality of separated energy absorbing structures 30-33, each having one or more base panels 56 to allow connection to the trim panel 12.

The front energy absorbing structure 30 of the upper energy absorbing assembly 14 is typically disposed in the front impact area 7*a* of the vehicle door 2 when the panel assembly 10 is installed with respect to the vehicle door 2. A weakening structure, such as an aperture or first window 64 is provided on the front longitudinal wall 38 of the front energy absorbing structure 30, and a second window 66 is provide on the rear longitudinal wall 40 of the front energy absorbing structure 30. The first window 64 occupies approximately 50-60% of the area of the front longitudinal wall 38, while the second window 66 occupies approximately 65-75% of the area of the rear longitudinal wall 40. The first window 64 and the second window 66 are sized and configured so that the front energy absorbing structure 30 provides energy absorption that falls within a predetermined range during an impact. Furthermore, in order to provide a desired deformation characteristic, such as controlling the order in which portions of the front energy absorbing structure 30 deform during impact, notches 65 are provided in the generally linear portions of the peripheral edges 52 of the lateral walls 50 at a distance from the base panels 56 that is selected to provide the desired deformation characteristic.

The front-middle energy absorbing structure 31 of the upper energy absorbing assembly 14 is typically disposed in the front impact area 7*a* of the vehicle door 2 when the panel assembly 10 is installed with respect to the vehicle door 2. A weakening structure, such as an aperture or third window 68 is provided on the front longitudinal wall 38 of the front-middle energy absorbing structure 31, and a fourth window 70 is provided on the rear longitudinal wall 40 of the front-middle energy absorbing structure 31. The third window 68 occupies approximately 60-70% of the area of the front longitudinal wall 38, while the fourth window 70 occupies approximately 60-70% of the area of the rear longitudinal wall 40. The third window 68 and the fourth window 70 are sized and configured so that the front-middle energy absorbing structure 31 provides energy absorption that falls within a predetermined range during an impact. Furthermore, in order to provide a desired deformation characteristic, such as controlling the order in which portions of the front-middle energy absorbing structure 31 deform during impact, notches 69 are provided in the generally linear portions of the peripheral edges 52 of the lateral walls 50 at a distance from the base panels 56 that is selected to provide the desired deformation characteristic.

The rear-middle energy absorbing structure 32 of the upper energy absorbing assembly 14 is typically disposed in the rear impact area 7b of the vehicle door 2 when the panel assembly 10 is installed with respect to the vehicle door 2. A weakening structure, such as an aperture or fifth window 72 is provided on the front longitudinal wall 38 of the rear-middle energy absorbing structure 32, and a sixth window 74 is provided on the rear longitudinal wall 40 of the rear-middle energy absorbing structure 32. The fifth window 72 occupies approximately 15-25% of the area of the front longitudinal wall 38, while the sixth window 74 occupies approximately 15-25% of the area of the rear longitudinal wall 40. Additionally, a stiffening structure, such as a first interior stiffening rib 73 is provided on an interior surface of the front longitudinal wall 38, laterally spaced from the fifth window 72, and a second interior stiffening rib 75 is provided on an interior surface of the rear longitudinal wall 40, laterally spaced from the sixth window 74. The stiffening ribs 73, 75 extend generally perpendicular to the front and rear longitudinal walls 38, 40, and extend continuously from the base ends 42a, 44a to the outboard ends 42b, 44b of the front and rear longitudinal walls 38, 40. When the panel assembly 10 is connected to the vehicle door 2, the first interior stiffening rib 73 is disposed above the fifth window 72, and the second interior stiffening rib 75 is disposed above the sixth window 74. The fifth window 72, the sixth window 74, the first rib 73 and the second rib 75 are sized and configured so that the rear-middle energy absorbing structure 32 provides energy absorption that falls within a predetermined range during an impact.

The rear energy absorbing structure 33 of the upper energy absorbing assembly 14 is typically disposed in the rear impact area 7b of the vehicle door 2 when the panel assembly 10 is installed with respect to the vehicle door 2. A weakening structure, such as an aperture or seventh window 76 is provided on the front longitudinal wall 38 of the rear energy absorbing structure 33, and an eighth window 78 is provided on the rear longitudinal wall 40 of the rear energy absorbing structure 33. The seventh window 76 occupies approximately 15-25% of the area of the front longitudinal wall 38, while the eighth window 78 occupies approximately 35-45% of the area of the rear longitudinal wall 40. Additionally, a third interior stiffening rib 79 is provided on an interior surface of the front longitudinal wall 38, laterally spaced from the seventh window 76. When the panel assembly 10 is connected to the vehicle door 2, the third interior stiffening rib 79 is disposed above the seventh window 76. The seventh window 76, the eighth window 78 and the third interior stiffening rib 79 are sized and configured so that the rear energy absorbing structure 33 provides energy absorption that falls within a predetermined range during an impact.

As seen in FIGS. 13-19, the lower energy absorbing assembly 16 includes the front energy absorbing structure 34, the middle energy absorbing structure 35, and the rear energy absorbing structure 36, which are arranged in an array longitudinally. When installed in the vehicle 1, the energy absorbing structures 34-36 are aligned in a front to rear manner with respect to the vehicle door 2. The lower energy absorbing assembly 16 includes a plurality of base panels 60 that interconnect the energy absorbing structures 34-36 and provide substantially planar surfaces having apertures 62 formed therethrough, in which the fasteners 24 are received to connect the lower energy absorbing assembly 16 to the trim panel 12. The lower energy absorbing assembly 16 may be fabricated as an integral structure, for example, as an injection molded plastic structure. However, the upper energy absorbing assembly 16 need not be formed integrally, and alternatively, could include a plurality of separated energy absorbing structures 34-36, each having one or more base panel 60 to allow connection to the trim panel 12.

The front energy absorbing structure 34 of the lower energy absorbing assembly 16 is typically disposed in the front impact area 7a of the vehicle door 2 when the panel assembly 10 is installed with respect to the vehicle door 2. A weakening structure, such as an aperture or ninth window 80 is provided on the front longitudinal wall 38 of the front energy absorbing structure 34, and a tenth window 82 is provided on the rear longitudinal wall 40 of the front energy absorbing structure 34. The ninth window 80 occupies approximately 70-80% of the area of the front longitudinal wall 38, while the tenth window 82 occupies approximately 70-80% of the area of the rear longitudinal wall 40. The ninth window 80 and the tenth window 82 are sized and configured so that the front energy absorbing structure 34 provides energy absorption that falls within a predetermined range during an impact. Furthermore, in order to provide a desired deformation characteristic, such as controlling the order in which portions of the front energy absorbing structure 34 deform during impact, a notch 81 is provided in the generally linear portion of each of the peripheral edges 52 of the lateral walls 50 at a distance from the base panels 60 that is selected to provide the desired deformation characteristic.

The middle energy absorbing structure 35 of the lower energy absorbing assembly 16 may be disposed in either the front impact area 7a or the rear impact area 7b of the vehicle door 2 when the panel assembly 10 is installed with respect to the vehicle door 2. Stiffening structures, such as a fourth interior stiffening rib 84 and a fifth interior stiffening rib 86 are provided on the interior surfaces of the front longitudinal wall 38, the rear longitudinal wall 40, and the top surface 46 of the middle energy absorbing structure 35. In particular the fourth and fifth interior stiffening ribs 84, 86 extend parallel to one another, and extend continuously from the base end 42a of the front longitudinal wall 38, along the front longitudinal wall 38, along the top surface 46, and along the rear longitudinal wall 40 to the base end 44a thereof. Additionally, a first exterior stiffening rib 88 and a second exterior stiffening rib 90 are provided on the exterior surface of the rear longitudinal wall 40 of the middle energy absorbing structure 35. In particular the first and second exterior stiffening ribs 88, 90 extend parallel to one another, and extend continuously from the outboard end 44b of the rear longitudinal wall 40 to the base end 44a thereof, across the base panel 60 and onward to the outboard end 42a of the exterior surface of the front longitudinal wall 38 of the rear energy absorbing structure 36. The fourth interior stiffening rib 84, the fifth interior stiffening rib 86, the first external rib 88 and the second external rib 90 are sized and configured so that the middle energy absorbing structure 35 provides energy absorption that falls within a predetermined range during an impact.

The rear energy absorbing structure 36 of the lower energy absorbing assembly 16 is typically disposed in the rear impact area 7b of the vehicle door 2 when the panel assembly 10 is installed with respect to the vehicle door 2. Stiffening structures, such as a sixth interior stiffening rib 92 and a seventh interior stiffening rib 94 are provided on the interior surfaces of the front longitudinal wall 38, the rear longitudinal wall 40, and the top surface 46 of the rear energy absorbing structure 36. In particular the sixth and seventh interior stiffening ribs 92, 94 extend parallel to one another, and extend continuously from the base end 42a of the front longitudinal wall 38, along the front longitudinal wall 38, along the top surface 46, and along the rear longitudinal wall 40 to the base end 44a thereof. Additionally, the first exterior stiffening rib 88 and the second exterior stiffening rib 90 are provided on the exterior surface of the front longitudinal wall 38 as previously described. The sixth interior stiffening rib 92, the seventh interior stiffening rib 94, the first external stiffening rib 88 and the second external stiffening rib 90 are sized and configured so that the rear energy absorbing structure 36 provides energy absorption that falls within a predetermined range during an impact.

The force experienced by the occupant during a side impact collision causes is related to the degree of foreshortening of the upper and lower energy absorbing structures 14, 16. Foreshortening can be defined as a reduction in the distance between the base ends 42a, 44a, of the front and rear longitudinal walls 38, 40 of the energy absorbing structures 30-36. As the occupant's body engages the panel assembly 10, either or both of the upper and lower energy absorbing assemblies 14, 16 deform as a reaction force is applied to the occupant by the trim panel 12 of the panel assembly 10, causing foreshortening of the energy absorbing structures 30-36 of the energy absorbing assemblies 14, 16. The energy absorbing assemblies 14, 16 are sized and configured to maintain the force experienced by the occupant's body below a certain maximum value throughout the range of foreshortening, while applying sufficient force to the occupant to gradually decelerate the occupant's body. However, the force applied to the upper and lower energy absorbing assemblies 14, 16 during an impact of a given magnitude will vary according to the mass of the vehicle occupant. Thus, an energy absorbing structure that is configured and sized to gradually decelerate an occupant having a relatively high mass may apply excessive force to an occupant having a relatively low mass. Therefore, by selectively providing weakening structures and stiffening structures in the energy absorbing structures 30-36 based upon their presence in either of the front impact area 7a, which will generally be struck by occupants having lower mass, or the rear impact area 7b, which will generally be struck by occupants having higher mass, an appropriate level of energy absorption may be applied to the body of the vehicle occupant during an impact.

Although the foregoing discussion describes the upper and lower energy absorbing assemblies 14, 16 of the panel assembly 10 as providing energy absorbing structures 30-36 that are appropriately sized according to the impacts expected in the front impact area 7a and the rear impact area 7b, it should be understood that the panel assembly 10 may be configured to provide appropriate energy absorption for any number of impact areas. For example, one or more intermediate impact areas (not shown) may be present between the front impact area 7a and the rear impact area 7b such that one or more of the energy absorbing structures 30-36 is disposed within that impact area and is configured and sized to apply a predetermined range of energy absorption thereto.

Figure 20:
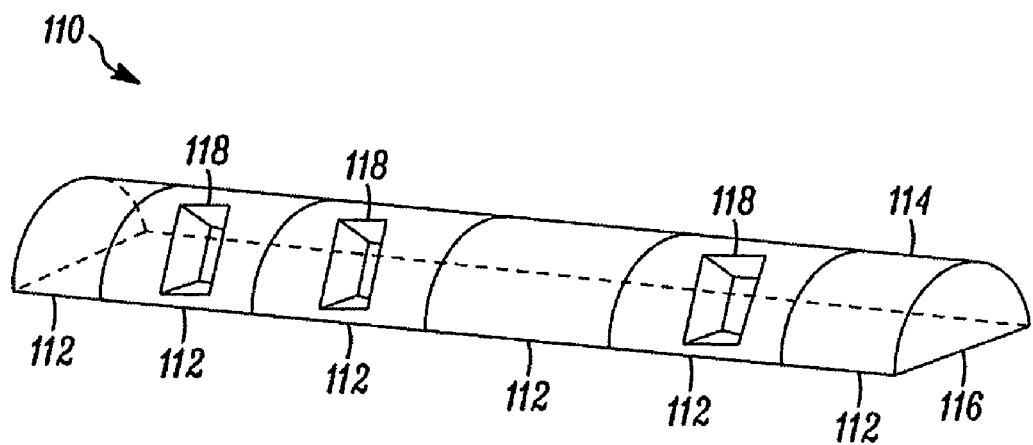
FIG. 20 is an energy absorbing assembly in accordance with another embodiment of the invention.

It should also be appreciated that the upper and lower energy absorbing assemblies 14, 16 are exemplary in nature, and appropriate levels of energy absorption may be applied to the front and rear impact areas 7a, 7b by providing other types of energy absorbing structures that are selectively provided with weakening and stiffening structures. For example, FIG. 20 shows an energy absorbing assembly 110 in accordance with another embodiment of the invention. The energy absorbing assembly 110 includes a plurality of energy absorbing structures 112 that form a semi-tubular structure having an arcuate top surface 114 and a substantially planar base 116. Weakening structures, such as apertures or windows 118 may be provided in the energy absorbing structures 112, such that the energy absorbing structures 112 are sized and configured to provide energy absorption that falls within a predetermined range during an impact.

Figure 21:
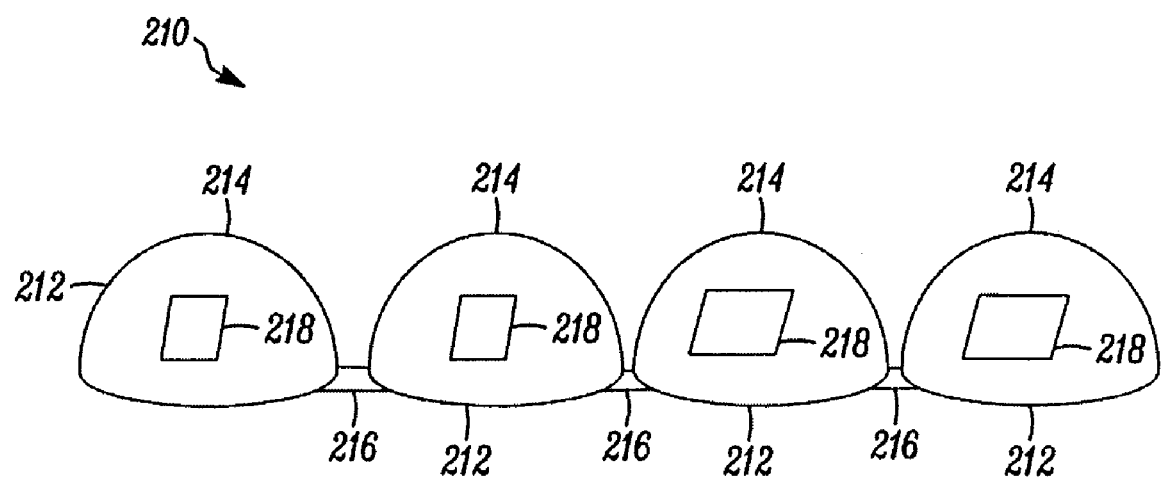
FIG. 21 is an energy absorbing assembly in accordance with another embodiment of the invention.

FIG. 21 shows an energy absorbing assembly 210 in accordance with another embodiment of the invention. The energy absorbing assembly 210 includes a plurality of semi-spherical energy absorbing structures 212 having arcuate top surfaces 214. The energy absorbing structures 212 are interconnected by a plurality of base panels 216. Weakening structures, such as apertures or windows 218 may be provided in the energy absorbing structures 212, such that the energy absorbing structures 212 are sized and configured to provide energy absorption that falls within a predetermined range during an impact.

Figure 22:
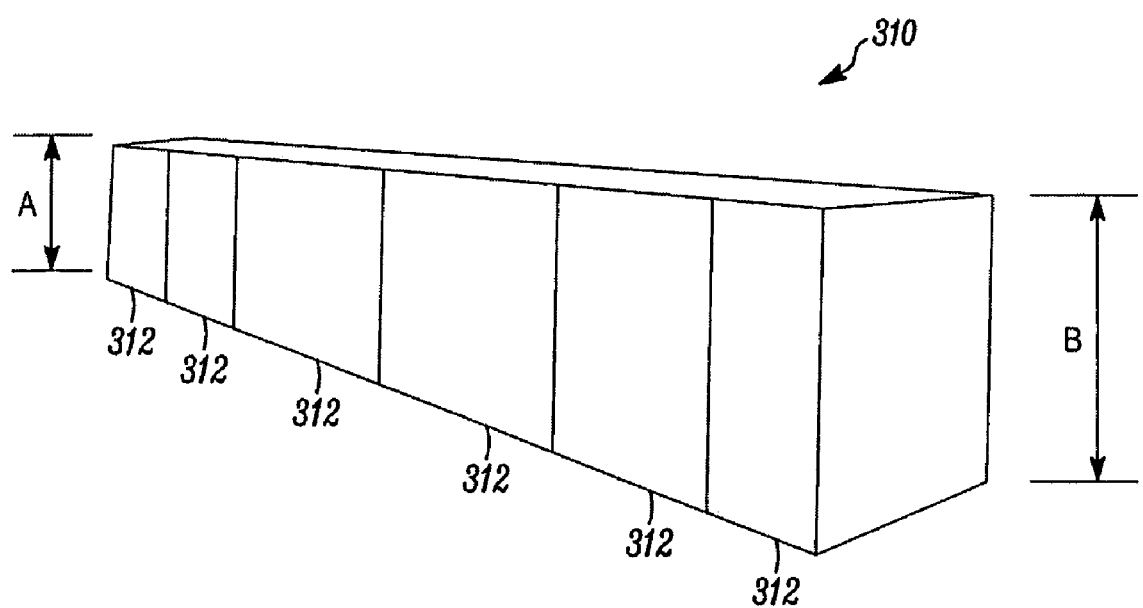
FIG. 22 is an energy absorbing assembly in accordance with another embodiment of the invention.

FIG. 22 shows an energy absorbing assembly 310 in accordance with another embodiment of the invention. The energy absorbing assembly 310 includes a plurality of energy absorbing structures 312 that are formed from foam or a similar energy absorbing structure. The energy absorbing structures 312 are arrayed longitudinally, and provide different levels of energy absorption, either by means of differing material properties, or by means of varying a transverse dimension of the energy absorbing structures 312 between a small dimension A, at which the energy absorbing structures 312 provide less energy absorption, and a large dimension B, at which the energy absorbing structures 312 provide greater energy absorption.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A panel assembly for a vehicle door, comprising;
   a trim panel having a first impact area and a second impact area;
   a first plurality of energy absorbing structures arranged in an array;
   a first energy absorbing structure of the first plurality of energy absorbing structures adapted to engage the first impact area of the trim panel, the first energy absorbing structure having a first predetermined range of energy absorption;
   a second energy absorbing structure of the first plurality of energy absorbing structures adapted to engage the second impact area of the trim panel, the second energy absorbing structure having a second predetermined range of energy absorption that is greater than the first predetermined range of energy absorption;
   the first energy absorbing structure having at least one side wall having a first aperture formed therethrough that is sized and configured so that the first energy absorbing structure has the first predetermined range of energy absorption; and the second energy absorbing structure having at least one side wall having a second aperture formed therethrough that is smaller than the first aperture and is sized and configured so that the second energy absorbing structure has the second predetermined range of energy absorption.

2. The panel assembly of claim 1, further comprising:
the first energy absorbing structure having at least one weakening structure that is sized and configured so that the first energy absorbing structure has the first predetermined range of energy absorption.

3. The panel assembly of claim 1, further comprising:
a third energy absorbing structure of the first plurality of energy absorbing structures having a third predetermined range of energy absorption that is greater than the second predetermined range of energy absorption, the third energy absorbing structure having at least one stiffening structure that is sized and configured so that the third energy absorbing structure has the third predetermined range of energy absorption.

4. The panel assembly of claim 1, further comprising:
the second energy absorbing structure having a stiffening structure that is sized and configured so that the second energy absorbing structure has the second predetermined range of energy absorption.

5. The panel assembly of claim 4, further comprising:
the second energy absorbing structure having at least one side wall; and
the stiffening structure including at least one rib provided on the side wall of the second energy absorbing structure.

6. The panel assembly of claim 1, further comprising:
the first energy absorbing structure having at least one side wall having an aperture formed therethrough that is sized and configured so that the first energy absorbing structure has the first predetermined range of energy absorption; and
the second energy absorbing structure having at least one side wall having a stiffening rib provided thereon that is sized and configured so that the second energy absorbing structure has the second predetermined range of energy absorption.

7. The panel assembly of claim 1, wherein the energy absorbing structures of the first plurality of energy absorbing structures are arrayed in a front to rear manner with respect to the vehicle door.

8. The panel assembly of claim 1, wherein the energy absorbing structures of the first plurality of energy absorbing structures are formed integrally.

9. The panel assembly of claim 1, wherein the first impact area is disposed forward of the second impact area with respect to the vehicle door.

10. A panel assembly for a vehicle door, comprising:
a trim panel having a first impact area and a second impact area;
a first plurality of energy absorbing structures arranged in an array;
a first energy absorbing structure of the first plurality of energy absorbing structures adapted to engage the first impact area of the trim panel, the first energy absorbing structure having a first predetermined range of energy absorption;
a second energy absorbing structure of the first plurality of energy absorbing structures adapted to engage the second impact area of the trim panel, the second energy absorbing structure having a second predetermined range of energy absorption that is greater than the first predetermined range of energy absorption;
a second plurality of energy absorbing structures arranged in an array, wherein the second plurality of energy absorbing structures is disposed below the first plurality of energy absorbing structures with respect to the vehicle door;
a fourth energy absorbing structure of the second plurality of energy absorbing structures adapted to engage the first impact area of the trim panel, the fourth energy absorbing structure having a fourth predetermined range of energy absorption; and
a fifth energy absorbing structure of the second plurality of energy absorbing structures having a fifth predetermined range of energy absorption that is greater than the fourth predetermined range of energy absorption.

11. A panel assembly for a vehicle door, comprising:
a trim panel having a first impact area and a second impact area;
a first plurality of energy absorbing structures arranged in an array;
a first energy absorbing structure of the first plurality of energy absorbing structures adapted to engage the first impact area of the trim panel, the first energy absorbing structure having a first predetermined range of energy absorption;
a second energy absorbing structure of the first plurality of energy absorbing structures adapted to engage the second impact area of the trim panel, the second energy absorbing structure having a second predetermined range of energy absorption that is greater than the first predetermined range of energy absorption;
at least one energy absorbing structure of the first plurality of energy absorbing structures having a lateral wall having a generally linear peripheral edge; and
a notch provided on the peripheral edge at a location selected to provide a predetermined deformation characteristic.

12. A panel assembly for a vehicle door, comprising:
a trim panel having a first impact area and a second impact area;
a first plurality of energy absorbing structures arranged in an array;
a first energy absorbing structure of the first plurality of energy absorbing structures adapted to engage the first impact area of the trim panel, the first energy absorbing structure having a first predetermined range of energy absorption;
a second energy absorbing structure of the first plurality of energy absorbing structures adapted to engage the second impact area of the trim panel, the second energy absorbing structure having a second predetermined range of energy absorption that is greater than the first predetermined range of energy absorption; and
at least one energy absorbing structure of the first plurality of energy absorbing structures having a top surface for engaging the vehicle door and at least one substantially planar side wall, wherein the top surface and the side wall are connected at a radiused corner.

13. A panel assembly for a vehicle door, comprising:
a trim panel having a first impact area and a second impact area;
a first plurality of energy absorbing structures arranged in an array;
a first energy absorbing structure of the first plurality of energy absorbing structures adapted to engage the first impact area of the trim panel, the first energy absorbing structure having a first predetermined range of energy absorption;

a second energy absorbing structure of the first plurality of energy absorbing structures adapted to engage the second impact area of the trim panel, the second energy absorbing structure having a second predetermined range of energy absorption that is greater than the first predetermined range of energy absorption; and at least one energy absorbing structure of the first plurality of energy absorbing structures having a top surface for engaging the vehicle door and at least one wire clip provided on the top surface.

14. A panel assembly for a vehicle door, comprising:

a trim panel having a first impact area and a second impact area;

a first plurality of energy absorbing structures arranged in an array;

a first energy absorbing structure of the first plurality of energy absorbing structures adapted to engage the first impact area of the trim panel, the first energy absorbing structure having a first predetermined range of energy absorption;

a second energy absorbing structure of the first plurality of energy absorbing structures adapted to engage the second impact area of the trim panel, the second energy absorbing structure having a second predetermined range of energy absorption that is greater than the first predetermined range of energy absorption;

a base panel provided between a pair of adjacent energy absorbing structures of the plurality of energy absorbing structures; and a fastener that connects the base panel to the trim panel.

15. A panel assembly for a vehicle door, comprising:

a trim panel having a first impact area and a second impact area;

a first plurality of energy absorbing structures arranged in an array;

a first energy absorbing structure of the first plurality of energy absorbing structures adapted to engage the first impact area of the trim panel, the first energy absorbing structure having a first predetermined range of energy absorption;

a second energy absorbing structure of the first plurality of energy absorbing structures adapted to engage the second impact area of the trim panel, the second energy absorbing structure having a second predetermined range of energy absorption that is greater than the first predetermined range of energy absorption; and each energy absorbing structure of the first plurality of energy absorbing structures having a contoured engagement surface formed thereon, wherein at least a portion of the contoured engagement surface complementarily engages the vehicle door in a normal operating condition of the vehicle.

16. A panel assembly for a vehicle door, comprising:

a trim panel having a first impact area and a second impact area;

a plurality of energy absorbing structures arranged in an array, each energy absorbing structure having a base end fixed to the trim panel and an outboard end adapted to engage the vehicle door;

a first energy absorbing structure of the plurality of energy absorbing structures adapted to engage the first impact area of the trim panel, the first energy absorbing structure having at least one weakening structure configured and sized to provide a first predetermined range of energy absorption;

a second energy absorbing structure of the plurality that provides a second predetermined range of energy absorption that is greater than the first predetermined range of energy absorption;

a base panel provided between a pair of adjacent energy absorbing structures of the plurality of energy absorbing structures; and a fastener that connects the base panel to the trim panel.

17. The panel assembly of claim 16, further comprising:

the at least one weakening structure including an aperture formed through at least one side wall of the first energy absorbing structure, the aperture sized and configured so that the first energy absorbing structure has the first predetermined range of energy absorption.

18. The panel assembly of claim 16, further comprising:

the second energy absorbing structure having at least one stiffening structure that is sized and configured so that the second energy absorbing structure has the second predetermined range of energy absorption.

19. The panel assembly of claim 16, further comprising:

the second energy absorbing structure having at least one side wall having a stiffening rib provided thereon that is sized and configured so that the second energy absorbing structure has the second predetermined range of energy absorption.

20. The panel assembly of claim 16, wherein the energy absorbing structures of the plurality of energy absorbing structures are arrayed in a front to rear manner with respect to the vehicle door.

21. The panel assembly of claim 16, wherein the energy absorbing structures of the plurality of energy absorbing structures are formed integrally.

22. The panel assembly of claim 16, wherein the first impact area is disposed forward of the second impact area with respect to the vehicle door.

23. A panel assembly for a vehicle door, comprising:

a trim panel coupled to the door and having at least a portion thereof that is spaced from the vehicle door, the trim panel having a first impact area and a second impact area;

a plurality of energy absorbing structures arranged in an array between the trim panel and the vehicle door, each energy absorbing structure having a base end and an outboard end and at least one sidewall therebetween, the base end fixed to the trim panel, the outboard end configured to engage the vehicle door, and the at least one sidewall including a structure that is sized and configured so that the energy absorbing structure has a predetermined range of energy absorption against the occupant during a side-impact collision;

at least a first energy absorbing structure of the plurality of energy absorbing structures includes a weakening structure that is sized and configured to provide a first predetermined range of energy absorption within the first impact area;

at least a second energy absorbing structure of the plurality of energy absorbing structures is configured to provide a second predetermined range of energy absorption within the second impact area that is greater than the first predetermined range of energy absorption; and at least one energy absorbing structure of the first plurality of energy absorbing structures having a top surface for engaging the vehicle door and at least one substantially planar side wall, wherein the top surface and the side wall are connected at a radiused corner.

24. The panel assembly of claim 23, further comprising:
the weakening structure including an aperture formed through at least one side wall of the first energy absorbing structure, the aperture sized and configured so that the first energy absorbing structure has the first predetermined range of energy absorption.

25. The panel assembly of claim 23, further comprising:
the second energy absorbing structure having at least one stiffening structure that is sized and configured so that the second energy absorbing structure has the second predetermined range of energy absorption.

26. The panel assembly of claim 23, further comprising:
the second energy absorbing structure having at least one side wall having a stiffening rib provided thereon that is sized and configured so that the second energy absorbing structure has the second predetermined range of energy absorption.

27. The panel assembly of claim 23, wherein the energy absorbing structures of the plurality of energy absorbing structures are arrayed in a front to rear manner with respect to the vehicle door.

28. The panel assembly of claim 23, wherein the energy absorbing structures of the plurality of energy absorbing structures are formed integrally.

29. The panel assembly of claim 23, wherein the first impact area is disposed forward of the second impact area with respect to the vehicle door.

* * * * *